United States Patent [19]

Kami et al.

[11] Patent Number: 4,538,831
[45] Date of Patent: Sep. 3, 1985

[54] SUSPENSION FOR VEHICLES

[75] Inventors: Yozo Kami, Saitama; Masaaki Minakawa; Kenji Kubo, both of Tokyo, all of Japan

[73] Assignee: Honda Giken Kogyo Kabushiki Kaisha, Tokyo, Japan

[21] Appl. No.: 553,905

[22] Filed: Nov. 21, 1983

[30] Foreign Application Priority Data

Nov. 24, 1982 [JP] Japan ................. 57-206658

[51] Int. Cl.³ .............................................. B60G 3/20
[52] U.S. Cl. .................................. 280/666; 280/670; 280/696
[58] Field of Search ............... 280/666, 661, 667, 696, 280/668, 695, 663, 664, 96.1, 670

[56] References Cited

U.S. PATENT DOCUMENTS

| 3,256,028 | 6/1966 | Fehlberg | 280/661 |
| 3,630,303 | 12/1971 | Froumajos | 180/256 |
| 4,223,903 | 9/1980 | Grabb et al. | 280/666 |
| 4,341,396 | 7/1982 | Decouzon et al. | 280/666 |

FOREIGN PATENT DOCUMENTS

| 1007618 | 10/1965 | United Kingdom . |
| 1040126 | 8/1966 | United Kingdom . |
| 1188884 | 4/1970 | United Kingdom . |
| 1227094 | 3/1971 | United Kingdom . |
| 1329070 | 9/1973 | United Kingdom . |
| 2106460 | 9/1981 | United Kingdom . |

Primary Examiner—Richard A. Bertsch
Attorney, Agent, or Firm—Armstrong, Nikaido, Marmelstein & Kubovcik

[57] ABSTRACT

A suspension for vehicles. The suspension includes a knuckle arm for supporting a steerable road wheel of the vehicle, an upper arm jointed at one end with the upper end of the knuckle arm and pivotably connected at the other end to a body frame of the vehicle, a lower arm jointed at one end with the lower end of the knuckle arm and pivotably connected at the other end to the body frame, and a shock absorber cooperating with the upper arm and the lower arm for suspending, through the knuckle arm, the steerable road wheel from the body frame. The upper arm has its position displaced longitudinally of the vehicle with a space left, and the shock absorber is disposed in the space obtained by the longitudinal displacement of the upper arm.

5 Claims, 3 Drawing Figures

SUSPENSION FOR VEHICLES

BACKGROUND OF THE INVENTION

1. Field of the Invention

The present invention generally relates to a suspension for vehicles and, more particularly, to a suspension for vehicles of the type in which steerable road wheels are suspended on the vehicle body side.

2. Description of Relevant Art

Generally, in a suspension for vehicles of what is called a double Wishbone type in which each steerable road wheel is suspended from a body frame through a shock absorber, upper and lower arms, and a knuckle arm jointed at the upper and lower ends thereof with the upper and lower arms, respectively, in order to avoid the interference of the road wheel, as steered, with the shock absorber, it is at least necessary to dispose the shock absorber substantially on the axis of rotation of the road wheel.

However, conventionally, in such an arrangement of the shock absorber, there has been a problem to be solved to avoid the resultant interference with the upper arm.

On the other hand, in general, the steering stability of vehicle becomes higher with increase in the caster angle which is desired to be set, for relatively low running speeds, relatively small to render light the steering wheel operation and, when cornering at relatively high running speeds, relatively large to raise the steering stability.

However, in a vehicle equipped with a conventional suspension of a double Wishbone type such as above, in which the caster angle is kept substantially constant, it is difficult to successfully satisfy such a desire.

The present invention has been achieved to effectively overcome such problems in a conventional suspension for vehicles.

SUMMARY OF THE INVENTION

According to the present invention, there is provided a suspension for a vehicle including a body frame and a steerable road wheel, comprising a knuckle arm for supporting the steerable road wheel, an upper arm jointed at one end thereof with the upper end of the knuckle arm and pivotably connected at the other end thereof to the body frame in a position displaced longitudinally of the vehicle with a space left, a lower arm jointed at one end thereof with the lower end of the knuckle arm and pivotably connected at the other end thereof to the body frame, and a shock absorber cooperating with the upper arm and the lower arm for suspending, through the knuckle arm, the steerable road wheel from the body frame, the shock absorber being disposed in the space obtained by the longitudinal displacement of the upper arm.

Accordingly, an object of the present invention is to provide a suspension for vehicles, in which a shock absorber can be arranged free from abutment with a steerable road wheel, even when the road wheel is steered, and take a sufficient stroke length for the damping effect, and which permits the steering wheel operation to be light when running at relatively low speeds and the steering stability to be high when cornering at relatively high running speeds.

The above and further features, objects and advantages of the present invention will more fully appear from the following detailed description of the preferred embodiment of the invention when the same is read in conjunction with the accompanying drawings.

DETAILED DESCRIPTION OF THE PREFERRED EMBODIMENT

Figure 1:
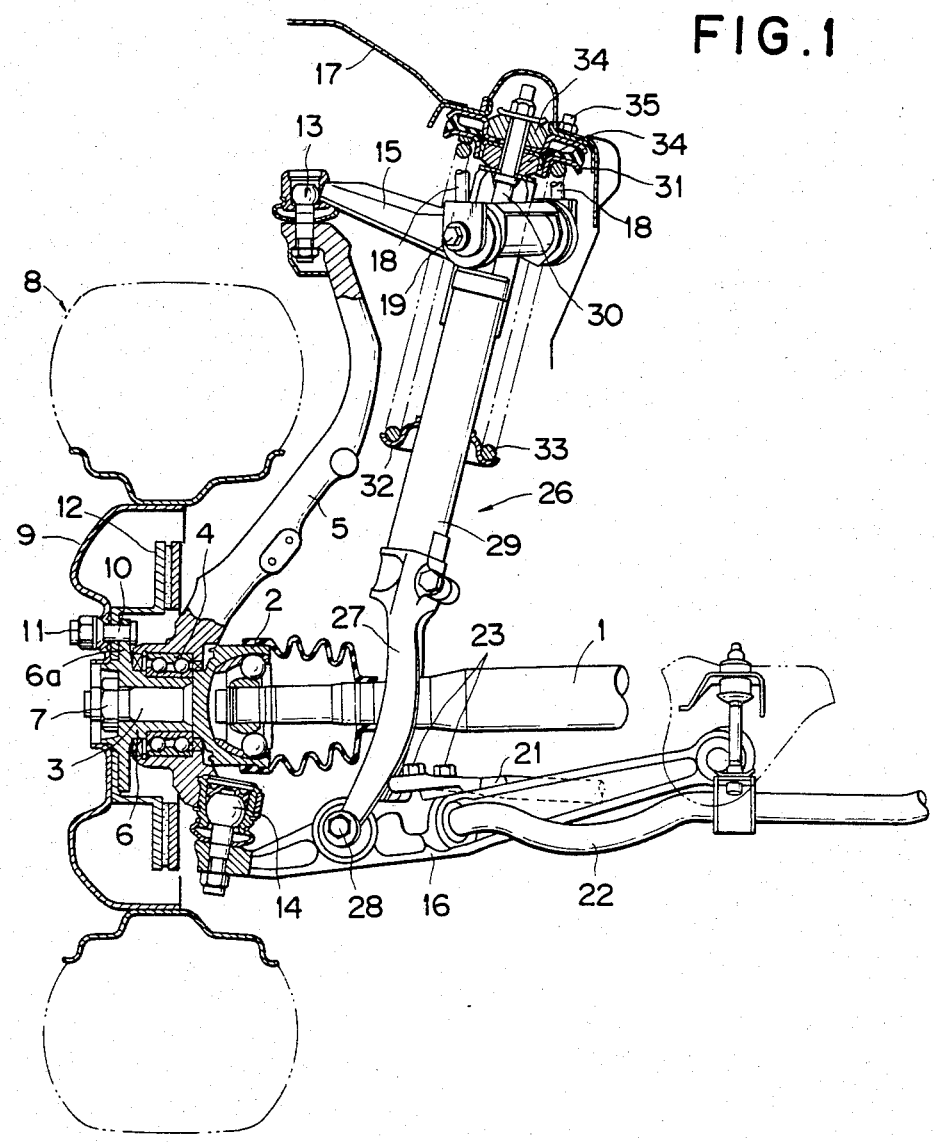
FIG. 1 is a rear view, partly in section, of a suspension, as equipped in a car, according to the present invention.
Figure 2:
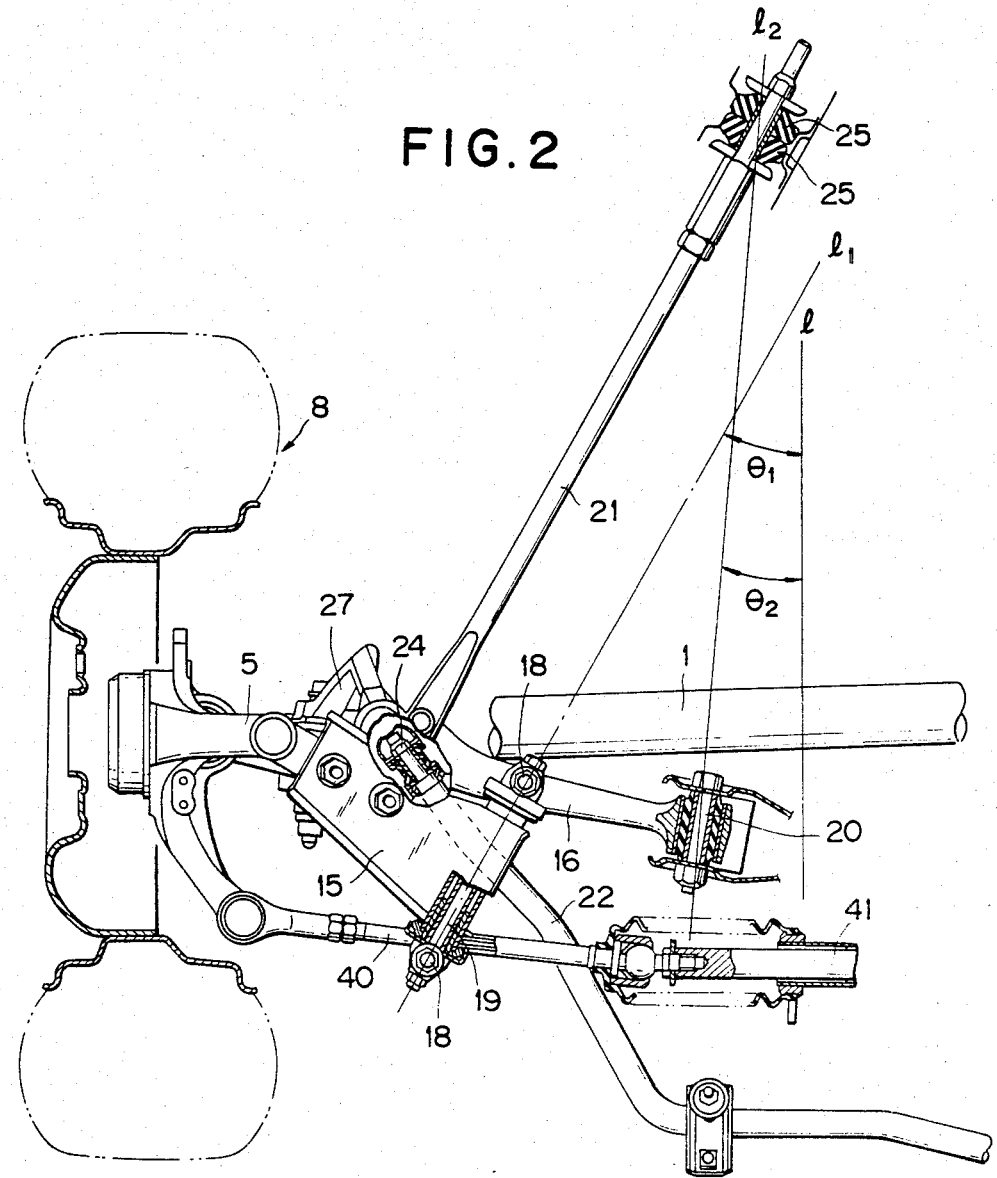
FIG. 2 is a plan view of the suspension of FIG. 1.

Referring first to FIGS. 1 and 2, designated at reference numeral 1 is a driving axle arranged transversely of a body frame of the car. At each end of the axle 1, as shown in FIG. 1, there is provided an axle shaft 3 journalled thereto through an equispeed universal joint 2. On the axle shaft 3 is splined a hub 6 which is rotatably supported through a bearing 4 by a knuckle arm 5 and axially secured with a nut 7 screwed on the distal end of the axle shaft 3. To a flanged part 6a of the hub 6 is integrally fixed a wheel disk 9 of a steerable road wheel 8 by fastening with bolts 10 and nuts 11, commonly with a brake drum 12 interposed between the hub 6 and the wheel disk 9. The road wheel 8 is steerably connected, as shown in FIG. 2, from the knuckle arm 5 through a tie rod 40 and a rack 41 to a steering wheel (not shown).

As shown in FIG. 1, the knuckle arm 5 is further connected at the upper and lower ends thereof through ball joints 13 and 14 to one ends of an upper control arm 15 and a lower control arm 16, respectively. The upper arm 15 is rearwardly deviated to be displaced as clearly shown in FIG. 2 with respect to the axle 1, and vertically pivotably attached at the other end thereof as in FIG. 1 to a side frame 17 of the body frame through a pivot pin 19 supported by means of a pair of bolts 18, 18. Also the other end of the lower arm 16 is vertically pivotably attached as in FIG. 2 through a pivot pin 20 to the body frame. The lower arm 16 is conneced at an intermediate portion thereof to one end of a radius rod 21 extending frontwardly of the lower arm 16 while slanting transversely inwardly of the body frame and one end of a stabilizer or roll bar 22 extending first rearwardly of the lower arm 16 while slanting transversely inwardly of the body frame and then substantially in parallel with the axle 1. Namely, as shown in FIG. 1, the radius rod 21 is fastened at the rear end thereof by a pair of bolts 23, 23 onto the upper surface of the lower arm 16 and, as shown in FIG. 2, the stabilizer 22 is inserted at the front end thereof in a fixing hole, which is formed through the lower arm 16, and secured with a nut 24. The other end of the radius rod 21, i.e. the front end thereof, is supported through a pair of rubber bushes 25, 25 by the body frame, while the stabilizer 22 is fixed at an intermediate portion thereof to the body frame.

In FIG. 1, generally designated at reference numeral 26 is a shock absorber installed between the lower arm 16 and the body frame, i.e., favorably disposed in a space obtained by giving a rearwardly displaced position to the upper arm 15, thereby avoiding the undesired interference of the upper part of the shock absorber 26 with the upper arm 15. To the lower part of the shock absorber 26 is secured a bifurcate member 27 through which the lower end of the shock absorber 26 is pivoted on the lower arm 16 by means of a bolt 28, while favorably avoiding the interference with the axle 1. In consequence, the shock absorber 26 is disposed on the axis of rotation of the road wheel 8, with a gap secured relative to the road wheel 8 when this is steered.

The shock absorber 26, which may be of any known hydraulic type, has a cylinder 29 in which a piston rod 30 is inserted from above. The piston rod 30 has at the lower end thereof in the cylinder 29 a piston (not shown) secured thereto and slidably fitted in the cylinder 29. On the upper part of the piston rod 30 and the outer circumference of an intermediate portion of the cylinder 29, there are fitted to be secured upper and lower spring seats 31, 32, respectively. The spring seats 31, 32 have a coil spring 33 therebetween and arranged coaxial with the cylinder 29. The upper end of the piston rod 30 is fastened through a pair of rubber bushes 34, 34 to the side frame 17 by means of bolts 35.

In the above arrangement, the power generated at an engine (not shown) is transmitted through the driving axle 1, universal joint 2 and axle shaft 3 to the hub 6, thereby finally driving to rotate the road wheel 8 fixed on the hub 6.

When the road wheel 8 is caused to move vertically, the upper and lower arms 15, 16 joined with the upper and lower ends of the knuckle arm 5, respectively, will vertically swing about respective axes of rotation thereof. In accordance with the vertical swing motion, the piston rod 30 of the shock absorber 26 will telescopically expand or contract relative to the cylinder 29, thereby producing a necessary damping force in the shock absorber 26, which damping force will effectively absorb or soften the shock given through the road wheel 8, thus improving the riding comfortability.

In the present embodiment, an upper control arm has the position thereof displaced rearwardly to provide a space for the installation of a shock absorber, so that the upper end of the shock absorber can be fixed without problem to a side frame arranged above the upper arm, thus providing a sufficient length for the shock absorber and thereby permitting the shock absorber to have a damping stroke preset sufficiently long.

Figure 3:
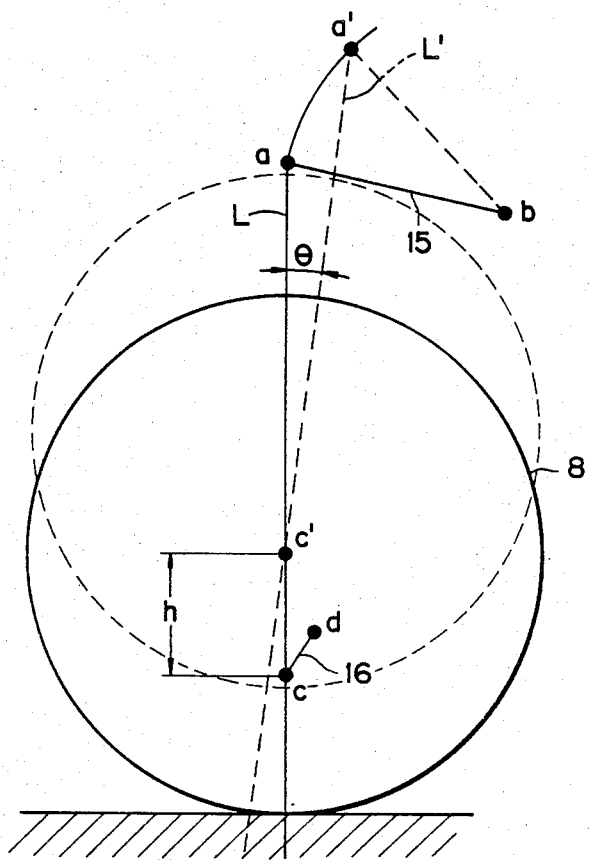
FIG. 3 is a side view of the suspension of FIG. 1, in the form of a model.

Moreover, the rearward displacement of the position of the upper arm has a favorable effect on the vehicle drivability as will be described hereinbelow in conjunction with FIG. 3 showing the above embodied suspension in the form of a model.

Accordingly, in FIG. 3, designated at reference numerals 8, 15 and 16 are the steerable road wheel, the upper control arm and the lower control arm, respectively, while labelled by reference characters a, b are the pivot point of ball joint and the pivot center of pivot shaft of the upper arm 15, respectively, and c, d are the pivot point of ball joint and the pivot center of the lower arm 16, respectively.

When the car is running at relatively low speeds, the caster axis L passing through both of the pivot points a and c will be kept substantially perpendicular to the ground as shown by solid line in FIG. 3, with a caster angle maintained substantially at zero degree, thus rendering favorably light the steering wheel operation, thereby raising the drivability.

When cornering at relatively high speeds, with the road wheel 8 as on the outside of the cornering caused to move suddenly upwardly by a height h as shown by broken line in FIG. 3 due to ground unevenness, the pivot point c will be displaced substantially vertically to a point c', for as seen from FIG. 2 the angle $\theta_2$ to be formed between the pivot shaft axis $l_2$ of the lower arm 16 and the longitudinal centerline l of the car is very small. On the other hand, as the angle $\theta_1$ to be formed between the pivot shaft axis $l_1$ of the upper arm 15 and the longitudinal centerline l is relatively large, the pivot point a will be moved curvilinearly rearwardly to a point a'. As a result, the caster axis L will be turned into a line L' passing through the points a' and c', thus giving a positive caster angle $\theta$, thereby raising the steering stability.

In the present embodiment, for providing a space for the installation of a shock absorber, an upper control arm has its position displaced rearwardly. However, such a space may be formed by frontwardly displacing the position of the upper arm in accordance with the car model.

Moreover, in the embodiment, each steerable road wheel may be a driving front wheel.

Although there have been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:
1. A suspension for a vehicle including a body frame and a steerable driving front road wheel, comprising:
   a knuckle arm for supporting said steerable driving road wheel;
   an upper arm joined at one end thereof with the upper end of said knuckle arm and pivotably connected at the other end thereof to said body frame;
   a lower arm joined at one end thereof with the lower end of said knuckle arm and pivotably connected at the other end thereof to said body frame; and
   a shock absorber cooperating with said upper arm and said lower arm for suspending, through said knuckle arm, said steerable driving front road wheel from said body frame;
   said shock absorber having in the lower part thereof a bifurcate member joined therewith at the upper part thereof, said bifurcate member being extended downwardly, avoiding interference with an axle, and pivotably connected at the lower part thereof to said lower arm, the upper end of said shock absorber being connected to said body frame, said other end of said upper arm being connected to said body frame in a position displaced longitudinally with respect to said vehicle relative to the connection of said shock absorber to said body frame.

2. A suspension according to claim 1, wherein:
said upper arm is rearwardly displaced.

3. A suspension according to claim 2, wherein:
said lower arm has the pivot axis thereof arranged substantially in parallel with the longitudinal centerline of said vehicle.

4. A suspension according to claim 2, wherein:
said steerable road wheel has the caster angle thereof preset to be substantially zero degree for the normal running of said vehicle.

5. A suspension according to claim 1, wherein:
said shock absorber comprises a cylinder and a coil spring coaxially fitted on said cylinder.

* * * * *

UNITED STATES PATENT AND TRADEMARK OFFICE
CERTIFICATE OF CORRECTION

PATENT NO. : 4,538,831
DATED : September 3, 1985
INVENTOR(S) : YOZO KAMI ET AL It is certified that error appears in the above-identified patent and that said Letters Patent is hereby corrected as shown below:

On the cover page, Item [75], change "Kenji Kubo" to --- Kanji Kubo ---.

Signed and Sealed this

Twenty-seventh Day of May 1986

[SEAL]

Attest:

DONALD J. QUIGG

Attesting Officer

Commissioner of Patents and Trademarks